US012155410B2

(12) United States Patent
Lim

(10) Patent No.: US 12,155,410 B2
(45) Date of Patent: Nov. 26, 2024

(54) METHOD AND SYSTEM FOR CONTROLLING RANGING PERIOD OF MULTI-RANGING SESSION OF UWB COMMUNICATION

(71) Applicant: HYUNDAI MOBIS Co., Ltd., Seoul (KR)

(72) Inventor: Jong Chul Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 107 days.

(21) Appl. No.: 18/085,906

(22) Filed: Dec. 21, 2022

(65) Prior Publication Data
US 2023/0283319 A1 Sep. 7, 2023

(30) Foreign Application Priority Data
Mar. 3, 2022 (KR) .................. 10-2022-0027560

(51) Int. Cl.
*H04B 1/69* (2011.01)
*G01S 13/76* (2006.01)
*H04B 1/707* (2011.01)
*H04B 1/713* (2011.01)
*H04B 1/7163* (2011.01)
*H04W 72/12* (2023.01)

(52) U.S. Cl.
CPC .......... *H04B 1/7163* (2013.01); *G01S 13/767* (2013.01); *H04W 72/12* (2013.01)

(58) Field of Classification Search
CPC ....... H04B 1/7163; H04B 1/69; G01S 13/767; H04W 72/12
USPC ......................... 375/219, 220, 130, 356, 354
See application file for complete search history.

(56) References Cited

U.S. PATENT DOCUMENTS 11,470,571 B2 * 10/2022 Henry .................. H04B 1/69

FOREIGN PATENT DOCUMENTS

KR 10-2011-0120773 11/2011

\* cited by examiner

*Primary Examiner* — Phuong Phu
(74) *Attorney, Agent, or Firm* — NSIP Law

(57) ABSTRACT

A method and system for controlling a ranging period of a multi-ranging session of ultra-wideband (UWB) communication, the method including defining a setup including multiple sessions in an ultra-wideband (UWB) communication, allotting and dividing a plurality of schedule blocks in a first session, the first session allotting and dividing including attempting a ranging by incorporating a first UWB signal into a first region for each schedule block and allotting and dividing one or more schedule blocks in an n-th session (n>1), wherein the n-th session allotting and dividing includes attempting a ranging by incorporating an n-th UWB signal.

14 Claims, 3 Drawing Sheets

METHOD AND SYSTEM FOR CONTROLLING RANGING PERIOD OF MULTI-RANGING SESSION OF UWB COMMUNICATION

CROSS-REFERENCE TO RELATED APPLICATION

This application claims the benefit under 35 USC § 119(a) of Korean Patent Application No. 10-2022-0027560, filed on Mar. 3, 2022, the entire disclosure of which is incorporated herein by reference in its entirety for all purposes.

BACKGROUND

1. Field

The present disclosure relates to a method and system for controlling a ranging period of a multi-ranging session of ultra-wideband (UWB) communication, and more particularly, to a method and system for controlling a ranging period of a multi-ranging session of UWB communication which are capable of increasing the probability of success of a ranging by setting the ranging period variably in the process of the ranging between a UWB system of a vehicle and a plurality of digital keys (smartphones), as well as which are capable of minimizing unnecessary standby power consumption that occurs when attempting the ranging.

2. Description of the Related Art

In these days, the distance between communication subjects is calculated by multiplying the signal arrival time between communication subjects by the speed of light with the use of Time of Flight (ToF) technology.

Such technology can be applied to the process of ranging from a vehicle to a plurality of smart phones using UWB communication. The vehicle can perform the ranging, i.e., distance measurement, simultaneously with multiple smartphones using UWB communication, and, however, in this process, synchronization of all the smartphones to be subjected to the ranging at one time is virtually impossible, so some of the smartphones can be ranged. In particular, there is a problem in that a great amount of power is consumed during the process of reception standby to continuously attempt the ranging with a plurality of smart phones whose ranging success is uncertain.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is a method for controlling a ranging period of a multi-ranging session of UWB communication, the method including defining a setup including multiple sessions in an ultra-wideband (UWB) communication, allotting and dividing a plurality of schedule blocks in a first session, the first session allotting and dividing including attempting a ranging by incorporating a first UWB signal into a first region for each schedule block and allotting and dividing one or more schedule blocks in an n-th session (n>1), wherein the n-th session allotting and dividing includes attempting a ranging by incorporating an n-th UWB signal.

The attempting of the ranging by incorporating the first UWB signal may include allotting a plurality of schedule blocks in the first session and setting a size of each schedule block as a first block size.

The attempting of the ranging by incorporating the first UWB signal may include allotting a plurality of schedule blocks in the first session and dividing and setting each schedule block into a plurality of regions.

The first block size may be a variable size.

The attempting of the ranging by incorporating the n-th UWB signal may include allotting a plurality of schedule blocks in an n-th session and setting a size of each schedule block to be n times a size of the schedule block of the first session.

The attempting of the ranging by incorporating the n-th UWB signal may include dividing each schedule block into a plurality of regions, and incorporating a second UWB signal in a second region.

The attempting of the ranging by incorporating the n-th UWB signal may also include allotting a schedule block having an increased size compared to the schedule block in the first session and dividing each schedule block into a plurality of regions.

The attempting of the ranging by incorporating the n-th UWB signal may include dividing a schedule block into a plurality of regions and incorporating a third UWB signal into a third region.

The attempting of the ranging by incorporating the n-th UWB signal may include allotting one schedule block in a third session and setting a size of that schedule block to be three times a size of the schedule block in the first session.

The attempting of the ranging by incorporating the n-th UWB signal may include allotting one schedule block in a fourth session and setting a size of that schedule block to be four times a size of the schedule block in the first session.

The attempting of the ranging by incorporating the n-th UWB signal includes dividing a schedule block into a plurality of regions and incorporating a fourth UWB signal into a fourth region.

In another general aspect, here is provided a method for controlling a ranging period of a multi-ranging session of UWB communication, the method including defining a setup including multiple sessions in an ultra-wideband (UWB) communication, allotting and dividing a plurality of schedule blocks in a first session, wherein the first session allotting and dividing includes setting a size of each schedule block and attempting a ranging by incorporating a first UWB signal into a first region for each schedule block, and allotting and dividing one or more schedule blocks in an n-th session (n>1), and the n-th session allotting and dividing includes attempting a ranging by incorporating an n-th UWB signal.

In another general aspect, here is provided a system for controlling a ranging period of a multi-ranging session of UWB communication, the system including a setup definition unit configured to define a setup including multiple sessions in an ultra-wideband (UWB) communication, a first ranging attempt unit configured to allot and divide a plurality of schedule blocks in a first session and attempt a ranging by incorporating a first UWB signal into a first region for each schedule block, and a second ranging attempt unit configured to allot and divide one or more schedule blocks in an n-th session (n>1) and attempt a ranging by incorporating an n-th UWB signal.

Other features and aspects will be apparent from the following detailed description, the drawings, and the claims.

Figure 1:
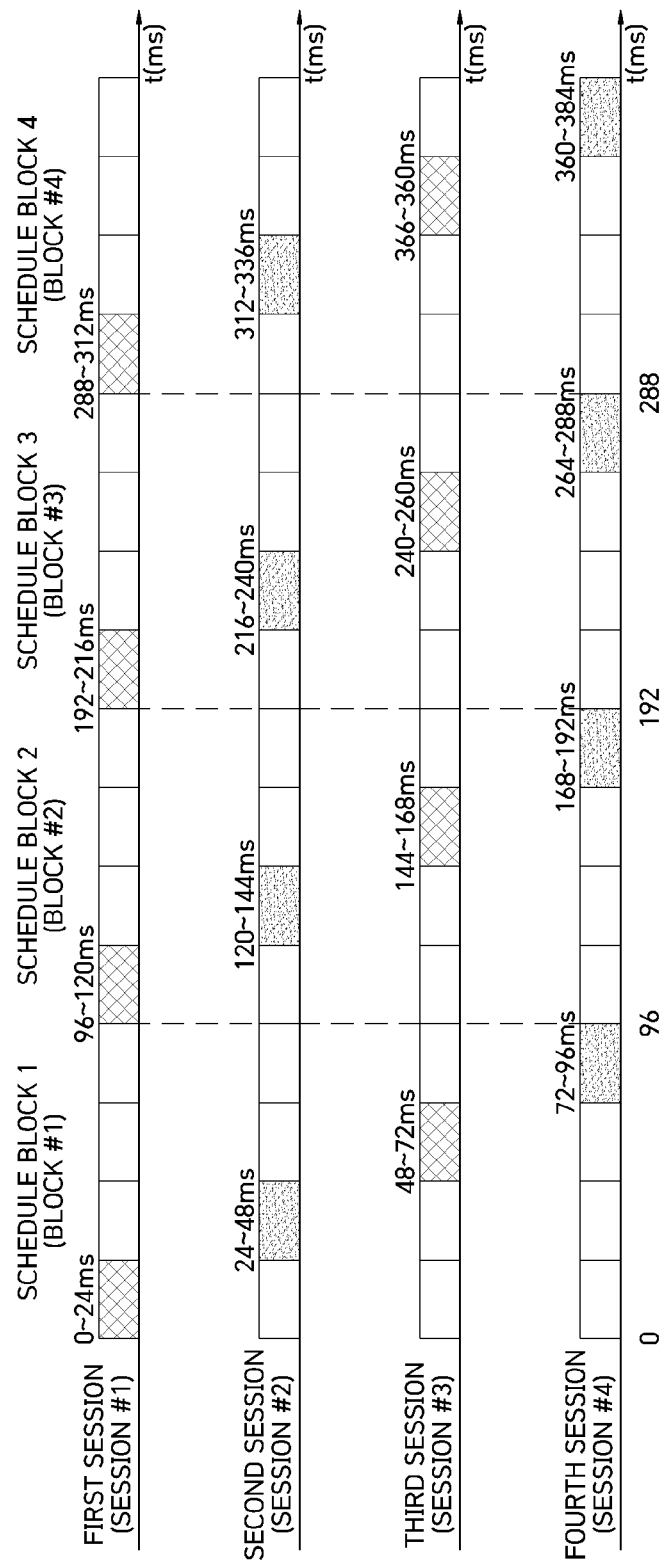
FIG. 1 is a diagram illustrating a general setup consisting of a plurality of sessions in ultra-wideband (UWB) communication and a process in which a ranging is attempted for each session through the setup.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.\

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a diagram illustrating a general setup consisting of a plurality of sessions in ultra-wideband (UWB) communication and a process in which a ranging is attempted for each session through the setup.

Referring to FIG. 1, in general, in the UWB communication, the ranging is performed according to a predefined setup (in this case, the setup consists of a plurality of sessions).

For example, the first session Session #1 of FIG. 1 is allotted a plurality of schedule blocks 1 to 4, and each schedule block is further divided into four regions (rounds). In this case, the size of each round is 24 ms, and the first session is to perform the ranging for a time period of 24 ms, which is the first round among the schedule block period of 96 ms.

For example, if the size of one schedule block is assumed to be 96 ms, up to 4 rounds, each of which is 24 ms, are possible, so the multi-ranging can be performed at a time on 4 smart phones or smart keys per vehicle.

However, in this case, in order to receive the UWB signal initially transmitted by each smart phone or smart key, the anchor of the vehicle must enter the reception standby state several milliseconds in advance.

For example, in FIG. 1, in the second session Session #2, the ranging attempt is made in the second round in the schedule block, and accordingly, the smartphone or smart key to be subjected to the second ranging transmits the UWB signal (Pre-poll) for the first time 24 ms after the ranging in the first session.

However, UWB anchors of vehicles that have just completed the operation of the first session at the time of 24 ms cannot immediately enter the reception standby for the UWB signal (pre-poll) transmitted from the second smartphone or smart key at the time of 24 ms in the second round of the second session, so the corresponding operation in the second session would actually fail.

Accordingly, as shown in FIG. 1, the ranging attempt in the second session is ignored, thereby leading to the ranging failure, and similarly, in the fourth session, the ranging fail as in the second session.

In other words, even if 4 rounds, each of which is 24 ms, are set up for 96 ms, the actual ranging success rate may be 50% or less. The results obtained through actual experiments regarding this matter are as follows.

1) Experiment on Multi-Ranging with 4 Smartphones

Measurement result of the ranging for 10 seconds (10000 ms/96 ms) If all were successful, the ranging was measured about 104 times per smartphone, and it can be seen that the ranging was successful up to 416 times from the vehicle's point of view since there were 4 smartphones.

This means that the evaluation was repeated 81 times (=3*3*3*3) and the ranging was successful at least 109 times, at most 246 times, and on average 152 times, and it can be seen that the success rate of about 37% was exhibited.

2) Experiment on Multi-Ranging with 3 Smartphones

Measurement result of the ranging for 10 seconds (10000 ms/96 ms) If all were successful, the ranging was measured about 104 times per smartphone, and it can be seen that the ranging was successful up to 312 times from the vehicle's point of view since there were 3 smartphones.

This means that the evaluation was repeated 27 times (=3*3*3) and the ranging was successful at least 111 times, at most 191 times, and on average 141 times, and it can be seen that the success rate of about 45% was exhibited.

3) Experiment on Multi-Ranging with 2 Smartphones

Measurement result of the ranging for 10 seconds (10000 ms/96 ms) If all were successful, the ranging was measured about 104 times per smartphone, and it can be seen that the ranging was successful up to 208 times from the vehicle's point of view since there were 2 smartphones.

This means that the evaluation was repeated 9 times (=3*3) and the ranging was successful at least 110 times, at most 114 times, and on average 112 times, and it can be seen that the success rate of about 54% was exhibited.

A practical problem in this regard is not that the number of ranging failures is large, but the electric current consumed continuously regardless of the actual ranging success or failure.

From the standpoint of the vehicle's UWB anchor, the continuous time scheduled ranging, reception standby for the ranging, and the actual ranging are repeated over and over again without any pause period. Therefore, unnecessary power consumption is occurring compared to the electric current consumed while the ranging is not performed (20 mA) in that while the ranging is actually performed, power of 100 mA or more is continuously consumed as an operating electric current regardless of the success or failure of the ranging.

In order to address this problem, in the present disclosure, if four multi-rangings are unavoidable, the length of the schedule block (ranging period) for each session is adjusted differently to reduce the number of failures, thereby minimizing power consumption.

Figure 2:
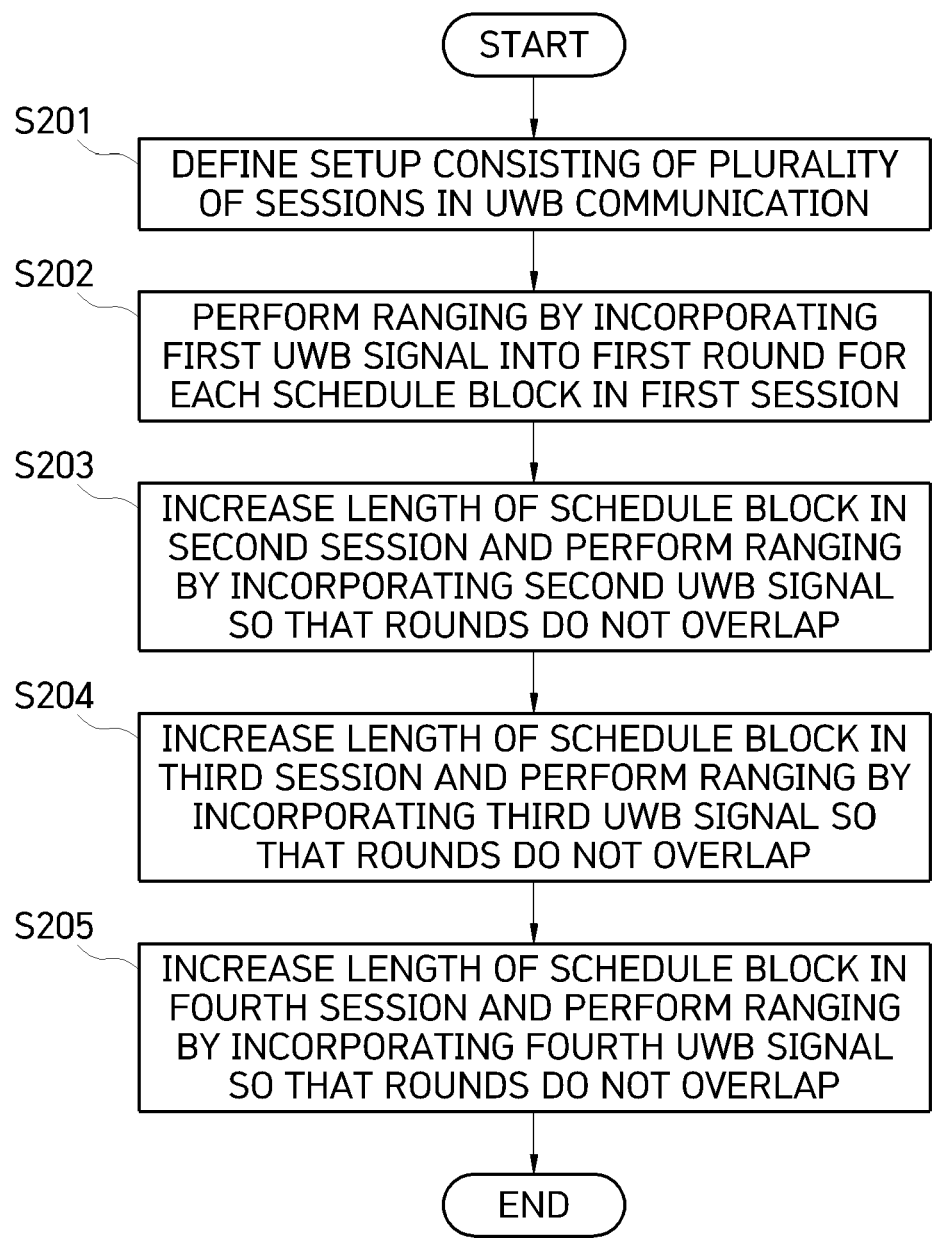
FIG. 2 is a diagram illustrating a process in which a ranging is attempted for each session through a method for controlling a ranging period of a multi-ranging session of UWB communication according to the present disclosure.
Figure 3:
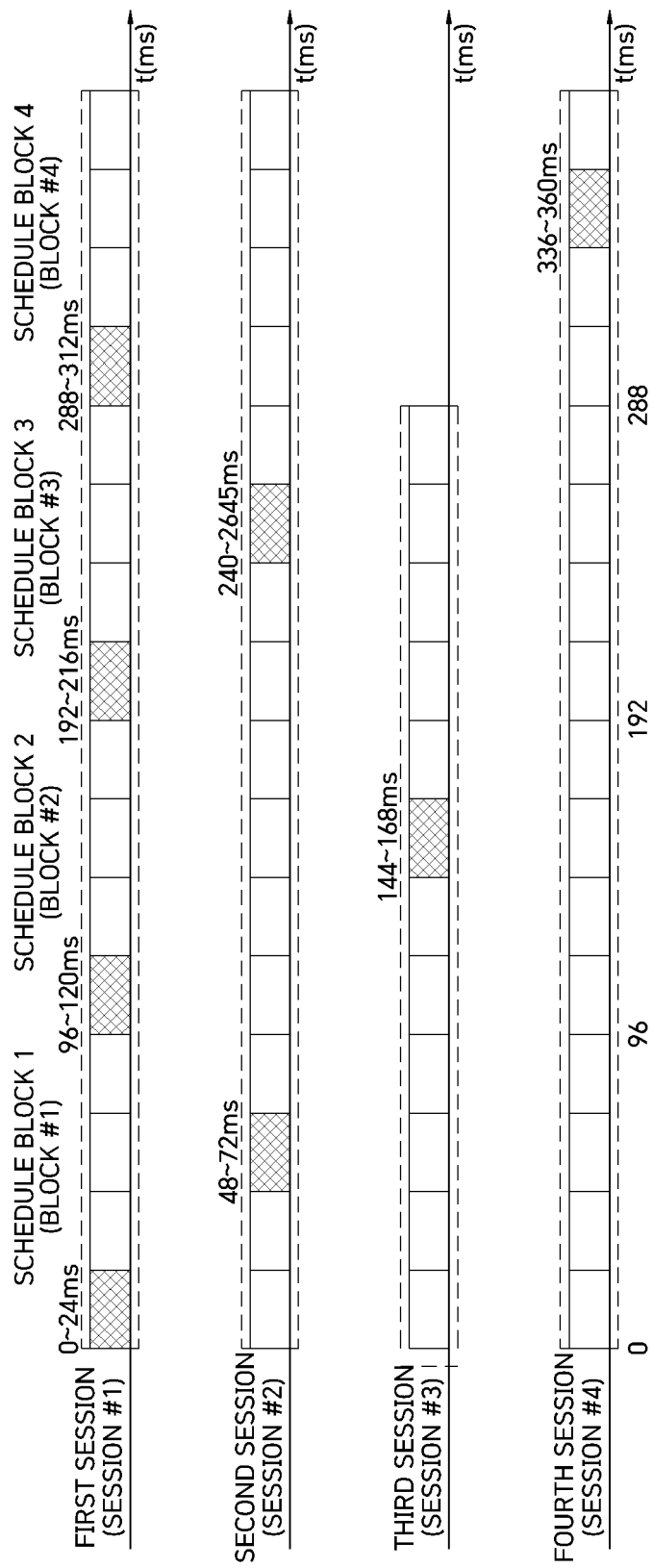
FIG. 3 is a flowchart illustrating a process in which a ranging is attempted for each session based on a method for controlling a ranging period of a multi-ranging session of UWB communication according to the present disclosure.

FIG. 2 is a diagram illustrating a process in which a ranging is attempted for each session through a method for controlling a ranging period of a multi-ranging session of UWB communication according to the present disclosure, and FIG. 3 is a flowchart illustrating a process in which a ranging is attempted for each session based on a method for controlling a ranging period of a multi-ranging session of UWB communication according to the present disclosure.

Referring to FIGS. 2 and 3 together, the method for controlling a ranging period of a multi-ranging session of UWB communication according to an embodiment of the present disclosure starts with the step of defining a setup consisting of a plurality of sessions in UWB communication (S201). In this step, a setup including multi-ranging sessions, i.e., the first to fourth sessions, for UWB communication is predefined.

Next, in order to receive the UWB signal initially transmitted from the first smartphone or smart key, four schedule blocks are allotted in the first session as shown in FIG. 3 (the number of schedule blocks allotted in the session may be variable), and each schedule block is divided into rounds (regions), each having a size of 24 ms (an example and not limited thereto), and then a ranging is attempted by incorporating the first UWB signal into the first round (regions) (S202). For example, in the first session, the ranging is attempted in a 24 ms round, which is the first round for each schedule block. In this case, the size of the schedule block may be referred to as a first block size. The first block size in this embodiment is 96 ms, but this is only an example and may be changed.

Next, in the second session where the second ranging is performed, the size of the schedule block in the first session (96 ms) is increased two times to double the previously performed ranging period. This is to divide the schedule block, which is twice as large as the schedule block in the first session, into 5 rounds (regions), and then attempt the ranging by incorporating the second UWB signal into the third round between 48 ms and 72 ms (S203).

Next, in the third session where the third ranging is performed, the size of the schedule block in the first session (96 ms) is increased three times (288 ms) to triple the previously performed ranging period. This is to divide the schedule block, which is three times as large as the schedule block in the first session, into 12 rounds (regions), and then attempt the ranging by incorporating the third UWB signal into the seventh round between 144 ms and 168 ms (S204). In this case, the schedule block in the third session is implemented as one schedule block.

Next, in the fourth session where the fourth ranging is performed, the size of the schedule block in the first session (96 ms) is increased four times (384 ms) to quadruple the previously performed ranging period. This is to divide the schedule block, which is four times as large as the schedule block in the first session, into 16 rounds (regions), and then attempt the ranging by incorporating the fourth UWB signal into the fifteenth round between 336 ms and 360 ms (S205).

When compared to the process in which the ranging is attempted for each session in the related art shown in FIG. 1 as described above, this means that the actual number of successful rangings is equally 8 for the same time (384 ms), whereas, in terms of power consumption, power was consumed in all 16 ranging attempts in the related art, but it is consumed in half the ranging attempts (8 times) in the present disclosure, thereby increasing efficiency.

This has the advantage of preventing unnecessary power consumption due to a ranging failure by increasing the length of the schedule block in accordance with the ranging sequence of the smart phone or smart key to be subjected to the ranging.

As described above, since the hopping method of determining a round occupying in the schedule block by varying the length of the schedule block in different sessions of the present disclosure (however, the lengths of the schedule blocks between sessions are not necessarily different from each other, and the lengths of the schedule blocks between some sessions may be the same depending on the number of sessions, or the like) is close to random, the probability that rounds of the schedule blocks between sessions overlap each other is reduced.

Meanwhile, the size of the schedule block in the session and the size of the round region in the schedule block may be variably set, and the increase in the size of the schedule block according to the increase in sessions may increase by n times in the order of the sessions (however, it is not necessarily limited thereto, and the schedule block size may be set in a different way depending on the implementation situation).

Meanwhile, the system for controlling a ranging period of a multi-ranging session of UWB communication according to an embodiment of the present disclosure may include at least one processor, memory, user input device, data communication bus, user output device, storage, network interface, and user interface. Each of the above-described components performs data communication through a data communication bus.

The present disclosure is intended to address the aforementioned problems, and is to provide a method and system for controlling a ranging period of a multi-ranging session of UWB communication, which are capable of increasing the probability of success of a ranging by setting the ranging period variably in the process of the ranging between a UWB system of a vehicle and a plurality of digital keys (smartphones), as well as which are capable of minimizing unnecessary standby power consumption that occurs when attempting the ranging.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for controlling a ranging period of a multi-ranging session of UWB communication by a system, the method comprising:
    defining a setup comprising multiple sessions in an ultra-wideband (UWB) communication;
    allotting and dividing a plurality of schedule blocks in a first session, wherein the first session allotting and dividing comprises attempting a ranging by incorporating a first UWB signal into a first region for each schedule block; and
    allotting and dividing one or more schedule blocks in an n-th session (n>1), wherein the n-th session allotting and dividing comprises attempting a ranging by incorporating an n-th UWB signal,
    wherein the attempting of the ranging by incorporating the n-th UWB signal comprises:
        allotting a plurality of schedule blocks in an n-th session; and
        setting a size of each schedule block to be n times a size of the schedule block of the first session.

2. The method of claim 1, wherein the attempting of the ranging by incorporating the first UWB signal comprises:
    allotting a plurality of schedule blocks in the first session; and
    setting a size of each schedule block as a first block size.

3. The method of claim 2, wherein the attempting of the ranging by incorporating the first UWB signal further comprises:
    allotting a plurality of schedule blocks in the first session and dividing; and
    setting each schedule block into a plurality of regions.

4. The method of claim 2, wherein the first block size is a variable size.

5. The method of claim 1, wherein the attempting of the ranging by incorporating the n-th UWB signal further comprises:
    dividing each schedule block into a plurality of regions; and incorporating a second UWB signal in a second region.

6. The method of claim 1, wherein the attempting of the ranging by incorporating the n-th UWB signal further comprises:
    allotting a schedule block having an increased size compared to the schedule block in the first session; and
    dividing each schedule block into a plurality of regions.

7. The method of claim 1, wherein the attempting of the ranging by incorporating the n-th UWB signal comprises:
    allotting a third schedule block in a third session; and
    setting a size of the third schedule block to be three times a size of a respective schedule block of the plurality of schedule blocks in the first session.

8. The method of claim 6, wherein the attempting of the ranging by incorporating the n-th UWB signal comprises:
dividing a schedule block into a plurality of regions; and
incorporating a third UWB signal into a third region.

9. The method of claim 1, wherein the attempting of the ranging by incorporating the n-th UWB signal comprises:
allotting a fourth schedule block in a fourth session; and
setting a size of the fourth schedule block to be three times a size of a respective schedule block of the plurality of schedule blocks in the first session.

10. The method of claim 9, wherein the attempting of the ranging by incorporating the n-th UWB signal comprises:
dividing a schedule block into a plurality of regions; and
incorporating a fourth UWB signal into a fourth region.

11. A method for controlling a ranging period of a multi-ranging session of UWB communication by a system, the method comprising:
defining a setup comprising multiple sessions in an ultra-wideband (UWB) communication;
allotting and dividing a plurality of schedule blocks in a first session, wherein the first session allotting and dividing comprise:
setting a size of each schedule block; and
attempting a ranging by incorporating a first UWB signal into a first region for each schedule block; and
allotting and dividing one or more schedule blocks in an n-th session (n>1), wherein the n-th session allotting and dividing comprises attempting a ranging by incorporating an n-th UWB signal,
wherein the allotting and dividing one or more schedule blocks in an n-th session (n>1) comprises:
performing a second ranging by setting a second length of a plurality of second schedule blocks to be twice a length of the first schedule blocks; and
incorporating a second UWB signal into a second region of the plurality of second schedule blocks.

12. The method of claim 11, wherein the allotting and dividing one or more schedule blocks in an n-th session (n>1) further comprises:
performing a third ranging by setting a third length of a plurality of third schedule blocks to be three times the length of the first schedule blocks; and
incorporating a third UWB signal into a third region of the plurality of third schedule blocks.

13. The method of claim 12, wherein the allotting and dividing one or more schedule blocks in an n-th session (n>1) further comprises:
performing a fourth ranging by setting a fourth length of a plurality of fourth schedule blocks to be four times the length of the first schedule blocks; and
incorporating a fourth UWB signal into a fourth region of the plurality of fourth schedule blocks.

14. A system for controlling a ranging period of a multi-ranging session of UWB communication, the system comprising:
one or more processors configured to:
define a setup comprising multiple sessions in an ultra-wideband (UWB) communication;
allot and divide a plurality of schedule blocks in a first session;
attempt a ranging by incorporating a first UWB signal into a first region for each schedule block;
allot and divide one or more schedule blocks in an n-th session (n>1); and
attempt a ranging by incorporating an n-th UWB signal,
wherein the attempting of the ranging by incorporating the n-th UWB signal comprises:
allotting a plurality of schedule blocks in an n-th session; and
setting a size of each schedule block to be n times a size of the schedule block of the first session.

* * * * *